July 31, 1934.  H. N. OTT  1,968,094
MICROSCOPE
Filed June 23, 1931  3 Sheets-Sheet 1
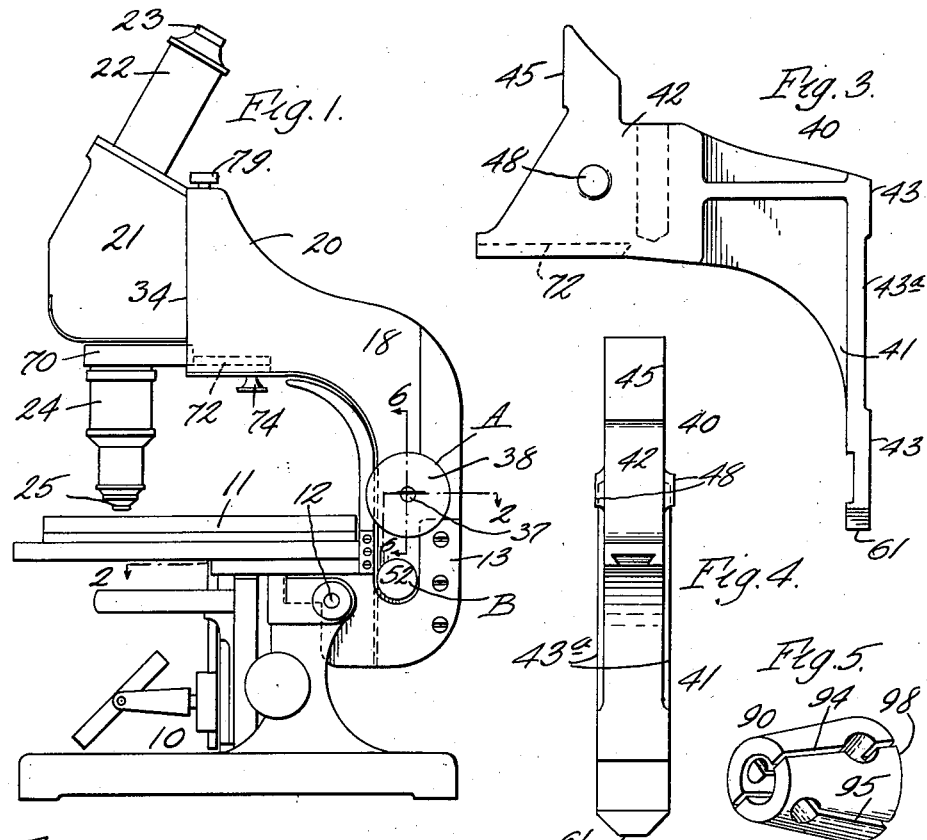
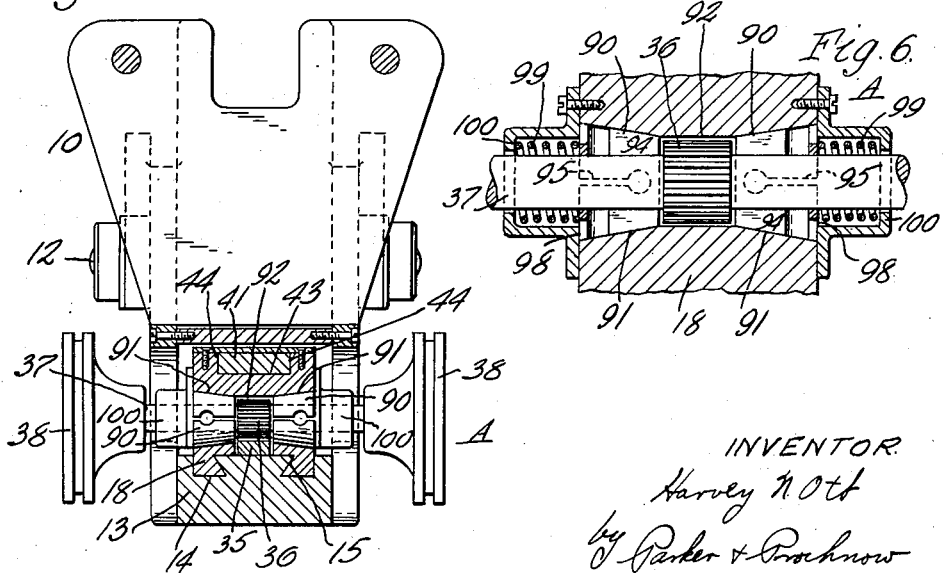
INVENTOR.
Harvey N Ott
by Parker & Prochnow
ATTORNEYS.

July 31, 1934.  H. N. OTT  1,968,094
MICROSCOPE
Filed June 23, 1931   3 Sheets-Sheet 2
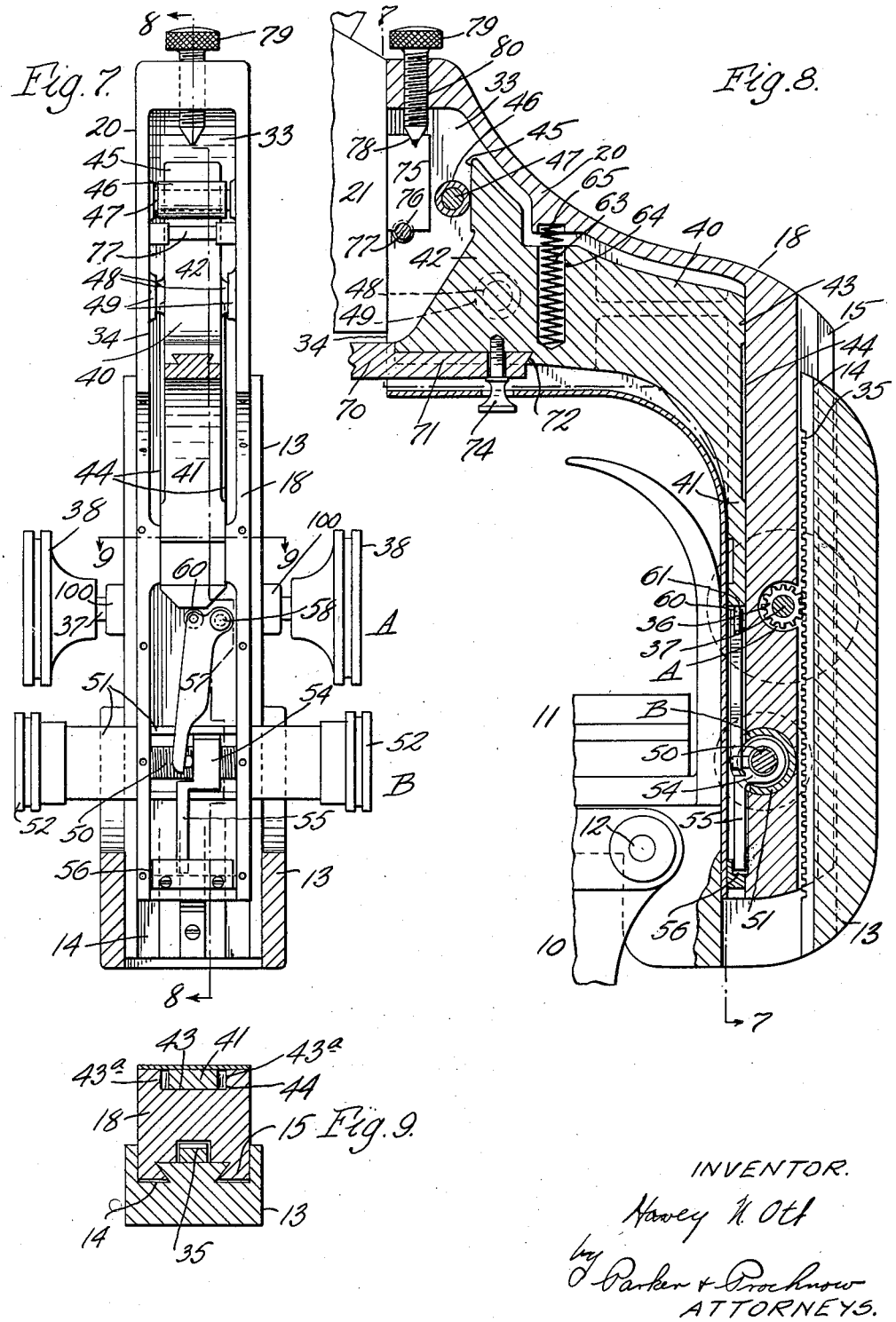
INVENTOR.
Harvey N. Ott
by Parker & Prochnow
ATTORNEYS.

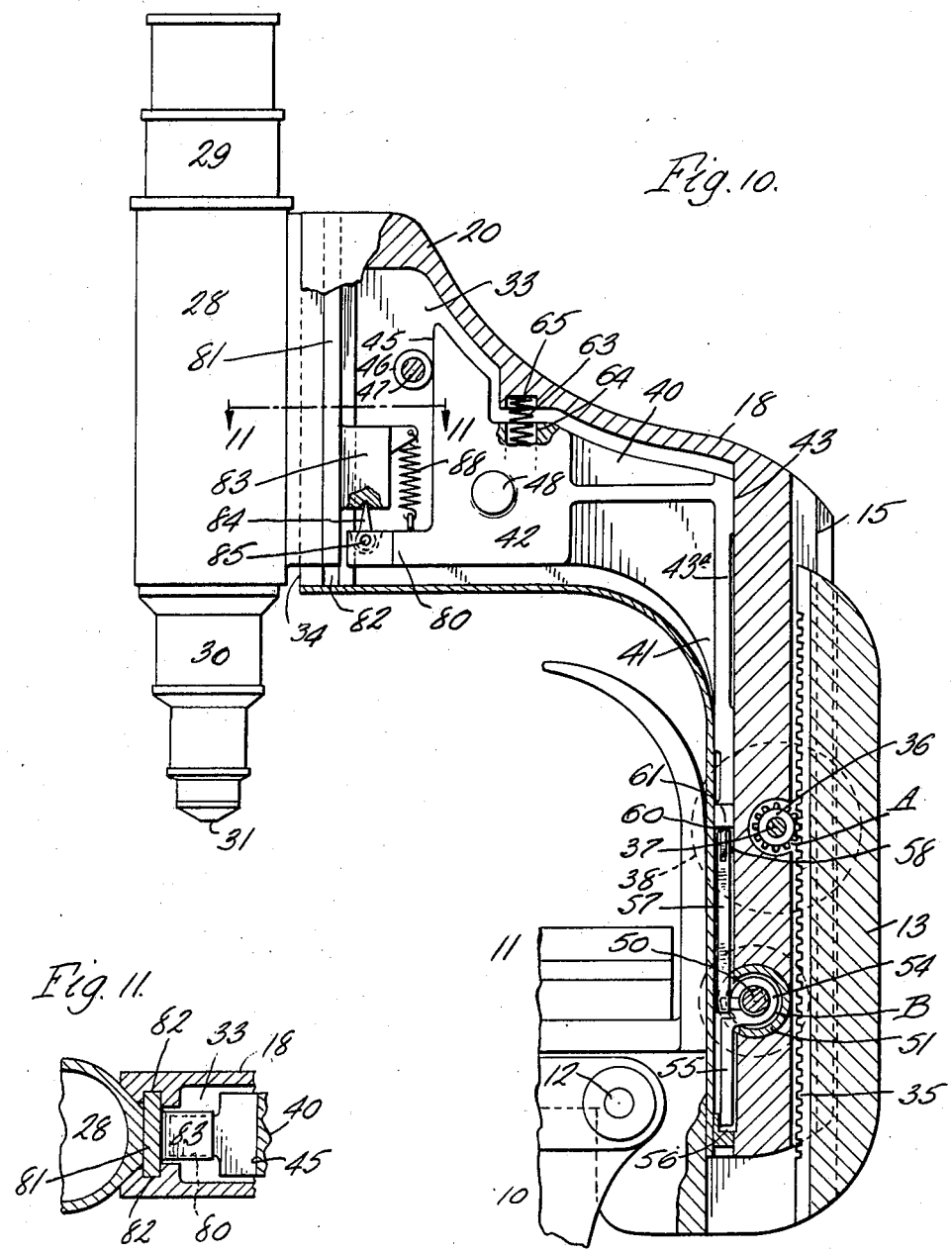

Patented July 31, 1934

1,968,094

UNITED STATES PATENT OFFICE 1,968,094

MICROSCOPE

Harvey N. Ott, Buffalo, N. Y., assignor to Spencer Lens Company, Buffalo, N. Y.

Application June 23, 1931, Serial No. 546,185

9 Claims. (Cl. 88—39)

This invention relates to improvements in microscopes.

In the usual types of microscopes, the operating knobs or buttons for the coarse and fine adjustments are located upon an upright arm or support at a considerable distance above the base and stage of the instrument, and are also usually spaced at some distance apart. In the larger microscopes, the upper parts of the arms or supporting members carrying these adjusting mechanisms extend away from the user of the instrument for supporting the optical system of the microscope in the proper position over the stage. Consequently, the lower part of the arm or support is close to the user, while said operating knobs and the optical system is at some distance from the body of the user, so that he is required to bend over the instrument to make observations through the eyepiece. It is, therefore, somewhat difficult or inconvenient to locate and manipulate the knobs of the adjusting mechanisms while making observations through the eyepiece of the instrument since they are at a distance from each other and are at such a height above the support on which the instrument rests that the hands cannot be firmly supported and steadied when making adjustments.

The arm and the aforementioned parts mounted thereon are usually connected to the base by a pivot or inclination joint to permit the upper part of the instrument to be tilted relatively to the base, and, when thus tilted to different positions, it is still more difficult to locate the buttons of the adjusting mechanisms since they occupy different relative positions to the base and to said inclination joint at different times. This often requires the user to either grope around until he finds the proper buttons, or he must remove his attention from the eyepiece so as to locate the buttons visually, thus interrupting his observations through the optical system of the instrument.

An important object of the present invention is to overcome the aforementioned objections found in microscopes heretofore constructed, by providing a microscope having the coarse and fine adjustment mechanisms disposed at the lower end of the arm adjacent the base, and also preferably adjacent the pivot or inclination joint, so that the operating knobs of said adjusting mechanisms are to be found at all times in the same approximate position relative to the base and the inclination joint, and can thus be easily located while observations are being made through the eyepiece of the optical system; and also to locate operating knobs of said adjusting mechanisms in a position where the hands of the user of the instrument can rest upon the surface upon which the instrument is supported while making adjustments so that the further advantage of steadiness in making such adjustments is provided for.

Other objects are to provide a microscope having improved means for supporting and adjusting the optical system thereof; also to provide a microscope having an arm in which the fine and coarse adjusting mechanisms and the connections between said adjusting mechanisms and the optical system of the instrument are contained; also to provide an improved bearing or mounting for the shaft of the rack and pinion of a microscope adjustment mechanism which permits vertically movable parts adjusted thereby to be frictionally held in adjusted position while, at the same time, allowing said mechanism to be easily and smoothly operated in either direction; and also to improve microscopes in the other respects hereinafter described and set forth in the claims.

In the accompanying drawings:

Fig. 1 is a side elevation of a microscope, illustrating one embodiment of my invention.

Fig. 2 is a horizontal section thereof, on an enlarged scale, on line 2—2, Fig. 1.

Fig. 3 is a side elevation, detached, of the secondary arm or support arranged between the fine adjustment mechanism and the optical system of the instrument.

Fig. 4 is a vertical edge view thereof.

Fig. 5 is a perspective view of one of the cone bearings for the shaft of one of the adjustment mechanisms of the instrument, detached.

Fig. 6 is a vertical section of the instrument, on an enlarged scale, on line 6—6, Fig. 1.

Fig. 7 is a fragmentary, vertical, sectional elevation of the instrument, taken approximately on line 7—7, Fig. 8.

Fig. 8 is a longitudinal, vertical section thereof, on line 8—8, Fig. 7.

Fig. 9 is a horizontal section thereof on line 9—9, Fig. 7.

Fig. 10 is a longitudinal, vertical section showing a second embodiment or modified construction of my invention.

Fig. 11 is a fragmentary, horizontal section thereof on line 11—11, Fig. 10.

The microscope shown in Fig. 1, and illustrating an embodiment of my invention, includes a base 10 upon which a stage 11 is mounted, preferably by means of a pivotal connection or inclination joint 12. The base also includes a post 13, extending laterally from said joint 12 and rigidly connected with the stage. This post is formed with an upright, dovetail guide 14 in which a complementary slide 15 of an arm or primary support 18 engages so as to be adjustable upwardly and downwardly relative to the base 10 and stage 11. This arm 18 serves the usual purpose of supporting the optical system of the instrument and, for this purpose is provided with a laterally extending or overhanging part 20.

The optical system may also be of any usual or suitable construction, that shown in Fig. 1, for example, including a body tube 21 at the upper end of which is mounted an eyepiece tube 22 provided with an eyepiece or ocular 23. Arranged at the lower end of the body tube 21 but not secured thereto, is an objective mounting 24 supporting at its lower end an objective 25.

In the construction shown in Fig. 10, the optical system comprises a body tube 28 having an eyepiece mounting 29 at its upper end and having secured to its lower end an objective mounting 30 carrying an objective 31.

As shown in the drawings, the upper part 20 of the primary arm or support 18 is of hollow construction having a cavity 33 therein terminating in a vertical opening 34 at the extreme end of the arm, which is closed by the body tube 21 or 28. The lower, upright part of said arm is substantially solid and is provided with a coarse adjustment mechanism A operatively engaging the post 13 to enable the arm to be adjusted relatively thereto. This coarse adjustment mechanism A may comprise the usual rack 35 formed on or secured to the dovetail guide 14 and which is engaged by a pinion 36 secured upon a horizontal, transverse operating shaft 37 journalled in the arm 18. The outer ends of the shaft are provided with operating knobs 38 which may be manipulated in one direction or another to elevate or lower the primary arm or support to effect preliminary or primary adjustments of the optical system relatively to the base 10 and stage 11.

As shown in Fig. 1, the coarse adjusting mechanism A is located at the lower end of the arm 18 near the inclination joint 12, and is therefore disposed in such a position that it can be readily manipulated while the hands are resting upon the surface which supports the instrument.

Arranged in the cavity 33 of the arm 18 is a secondary support or arm 40 which, as shown, includes an upright slide or part 41 and a laterally extending head 42. The slide portion 41 is provided with a vertical finished transverse face 43 and opposite parallel side edges 43a which slidably engage in a vertical guideway 44 in the lower, upright part of the arm 18. The head 42 of the arm 40 is provided with a vertical face 45 which slidably engages a guide roller 46 journalled on a fixed, horizontal pin 47 extending transversely of the cavity 33 adjacent the open end 34 thereof. The head is also provided with oppositely extending finished side bosses 48 which slidably engage similar, inwardly-extending bosses 49 on the side walls of the cavity 33. The secondary arm 40 is thus arranged to move vertically up and down in the cavity 33 and relatively to the arm 18, and in both of the constructions illustrated, said arm 40 is provided with a part operatively connected to the optical system of the instrument laterally of and at a considerable distance from said slide 41 for effecting an adjustment or movement of said system or a part thereof relatively to the arm 18, and to the base 10 and stage 11.

A fine adjusting mechanism B is provided for actuating the secondary support or arm 40 relatively to the arm 18. The fine adjusting mechanism B may be of any usual or suitable construction, that shown comprising a horizontal threaded shaft 50 journalled in a fixed hollow sleeve 51 horizontally mounted in the lower end of the arm 18 adjacent the inclination joint 12, and preferably below the stage 11 and coarse adjusting mechanism A of the instrument. The shaft 50 is provided exteriorly of the arm 18 with operating knobs 52, and within said hollow sleeve 51 with a transversely movable nut or slide 54 which is provided with a depending part 55 engaging at its lower end in a transverse, hollow groove 56 in said sleeve 51 which thus permits said slide 54 to move lengthwise of the screw shaft 50 without rotating about the same. The slide 54 bears against the lower end of an arm of a transversely arranged bell crank lever 57 pivoted at 58 upon the lower end of the arm 18. The bell crank lever 57 is provided with a second arm or part which carries a roller 60 operatively engaging the lower end 61 of the secondary arm or support 40.

By turning the shaft 50 in one direction, by means of the knobs 52, the bell crank lever 57 is swung about its pivot 58 in a manner to cause the roller 60 thereof to press against and raise the arm 40 relatively to the arm 18, while by turning the shaft 50 in the opposite direction, the roller 60 will move downwardly with respect to the pivot 58, so that the arm 40 can follow it in a downward direction relatively to said arm 18. Preferably firm contact between the arm 40 and the bell crank lever 57 is assured by a compression coil spring 63 arranged in a pocket 64 in the head 42 of the arm 40, and which bears at its upper end against a seat 65 in the other arm 18, thus preventing the arm 40 from sticking in its guide 43 when a downward adjustment of the fine adjusting mechanism is made.

In the construction shown in Figs. 1-8, the objective mounting 24 and objective 25 are attached to a horizontal bracket 70 which extends out of the open end 24 of the arm 18 and is provided at one end with a dovetail portion 71 fitting in a corresponding seat or guideway 72 in the lower part of the head 42 of the secondary arm or support 40. The bracket 70 may be releasably secured in said guide 72 by means of a screw 74. The remaining parts of the optical system, including the body tube 21, are rigidly supported on the primary support or arm 18 of the instrument by suitable means. For example, the body tube 21 may be provided with a laterally extending block or projection 75 formed at its lower end with a transverse, horizontal groove 76 which engages over a fixed, transverse rod or pin 77 arranged in the open end of the cavity 33. The upper end of said block 75 is provided with a tapered or conical seat 78 for the reception of the correspondingly formed lower end of a locking screw 79 which operatively engages in a threaded vertical hole 80 in the arm. By this construction, the body tube 21 can be secured in place by engaging the block 75 over the pin 77 with the adjacent vertical face of said body tube abutting the vertical edges of the opening 24 and locking it in place by means of the screw 79.

It will be seen that in the construction illustrated in Figs. 1-8, the optical system as a whole can be adjusted relatively to the base 10 and stage 11 by actuating the coarse adjusting mechanism A which raises and lowers the primary arm or support 18, the secondary arm or support 40 and the entire optical system as a unit, thus permitting approximate adjustments of the optical system to be made relative to the base 10 and stage 11. Exact adjustments of the objective 25 can then be made by actuating the fine adjustment mechanism B which causes the secondary support or arm 40 and the objective 25 to be raised or lowered relatively to the base 10 and stage 11, and also with respect to the body tube 21 and remaining parts of the optical system.

In the modified construction shown in Figs. 10 and 11, the primary and secondary arms or supports 18 and 40, together with the entire optical system, are also movable as a whole relatively to the base 10 and stage 11 by appropriate manipulation of the coarse adjusting mechanism A, but in this construction the entire optical system is also adjustable relatively to the arm 18 and to the base 10 and stage 11, by means of the fine adjusting mechanism B by movement of the arm 40. To effect this result, the arm 40 is provided with a projection 80 which operatively engages a part of the optical system to cause the same to be raised and lowered.

As shown, the body tube 28 is provided with a vertical slide 81 movable in vertical guideways 82 formed on the arm 18 adjacent the open end 24 thereof. The guide 81 is provided with a laterally extending block 83 which is engaged at its lower end by the upper end of a link or stud 84 pivoted at 85 to said projection 80 of the arm or support 40.

In this manner, the upward movements of the secondary arm or support 40 will be transmitted to and effect corresponding movements of the optical system, while downward movements of the arm 40, as effected by the fine adjusting mechanism B, will be repeated in the optical system by causing the block 83 to remain in engagement with the link 84, as by means of a tension spring 88 secured at one end to said block 83 and at said other end to the extension 80.

It is desirable in microscopes having parts which are relatively movable or adjustable vertically, such, for example, as the arm 18 relatively to the stationary post 13, to provide means insuring the retention of said arm in any position in which it may be adjusted, so that it will not be lowered or displaced by its own weight, and, at the same time, permitting easy and smooth adjustments of the rack and pinion mechanism. Any suitable means may be provided for frictionally resisting relative movement of these two parts, but preferably the following construction, illustrated in Figs. 2, 5 and 6, wherein the shaft 37 of the coarse adjusting mechanism A cooperates with certain friction members to resist turning of the shaft. In the particular construction shown, the arm 18 is provided with a tapered bearing recess having substantially frusto-conical seats 91 in a horizontal bore formed in the arm 18, and suitable bearing or friction cones 90 are yieldingly pressed into the space between the conical seats and the shaft 37 to resist turning of the shaft. These cones may be splined to the shaft to turn therewith and to have their outer surfaces bear frictionally against the seats 91, or if desired, the bearing cones may be split and bear directly against the shaft 37, in which case the tapered or frusto-conical faces serve merely to wedge the bearing cones against the shaft. In the particular structure shown by way of example, the cones 90 are split lengthwise at 94 and 95 to enable the cones to yield or to be compressed to a limited extent toward the shaft to cause the cones to bind frictionally against the shaft. For this purpose the outer, transverse end or face 98 of each cone is engaged by a compression spring 99 disposed in a cap 100 secured to said arm 18. The springs 99 are of such strength that the pressure exerted by them upon the cones 90 will cause sufficient frictional engagement between said cones and the shaft 37 to retain the rack and pinion in any of its adjusted positions. Nevertheless, the rack and pinion adjusting mechanism A will work easily and smoothly in either direction.

The microscope herein described is a great improvement over previous types, since by the location of both the coarse and fine adjustments low down, near the base of the instrument, a much steadier control over the adjusting mechanisms and their resulting action upon the optical system can be had since the user is able to steady his hands upon the support on which the instrument rests.

Furthermore, the knobs of the adjusting mechanisms can be much more readily located, while the user is looking through the eyepiece, thus avoiding the interruption of observations when making adjustments. This improved result is further assured by the location of the adjusting knobs of both mechanisms close to each other and also to the inclination joint, so that, no matter to what inclination the body of the instrument is tilted, those knobs are always approximately in the same position relative to said joint and to the base.

I claim:

1. In a microscope, a base, an upwardly and forwardly extending hollow arm movably mounted thereon to slide up and down thereon at the rear thereof, an optical system operatively mounted at the forward end of said arm, adjusting means for shifting said arm up and down relatively to said base to effect adjustments of said optical system relatively to said base, a second upwardly and forwardly extending arm disposed and slidably arranged in the hollow of said first arm and operatively connected at its upper forward end to said optical system, and adjusting means for shifting said second arm relatively to said first arm to effect other adjustments of said optical system relative to said base.

2. In a microscope, a base, an upwardly and forwardly extending hollow arm movably mounted to slide up and down thereon at the rear thereof, an optical system operatively mounted at the forward end of said arm, a second arm slidably arranged in the hollow of said first arm and having a forwardly extending part operatively connected to said optical system, adjusting mechanism interposed between said first arm and said base for slidably shifting both of said arms together for effecting adjustments of said optical system, and adjusting mechanism interposed between said arms for slidably shifting said second arm relatively to said first arm for effecting other adjustments of said optical system.

3. In a microscope, a base, a hollow arm slidably mounted thereon and having a laterally opening end, an optical system connected to said open end of said arm, a second arm slidably arranged in said hollow arm, upright guide faces thereon engaging corresponding faces, a transverse upright face on said second arm slidably engaging a relatively fixed roller extending crosswise of the open end of said hollow arm on said first arm so that said second arm may move, up and down relatively to said first arm, means for slidably adjusting said hollow arm relatively to said base for effecting adjustments of said optical system, and adjusting means engaging said second arm to effect said up and down movements thereof for further adjusting said optical system.

4. A microscope having two relatively movable members, and means for adjusting one of said members with respect to the other including a shaft journalled in one of said members and arranged to operatively engage the other member, said first member having an aperture therein provided with tapering walls, a bearing member adapted to extend into the space between said tapering walls and said shaft, and means for yieldingly pressing said bearing member into the space between said shaft and said tapering walls to provide friction resisting the turning of said shaft.

5. A microscope having two relatively movable members, and means for adjusting one of said members with respect to the other including a shaft journalled in one of said members and arranged to operatively engage the other member, said first member having an aperture provided with frusto-conical seats and through which aperture said shaft extends, and friction members arranged in the spaces between said shaft and said frusto-conical seats, and yielding means pressing said friction members into the space between said shaft and said seats to resist turning of said shaft.

6. In a microscope, a base, a stage supported thereon, an arm having a part movably mounted upon said base at one side of said stage and projecting upwardly in a position to be close to the body of a person using the microscope, said arm also having a laterally projecting hollow head extending away from the user and overhanging said stage, a second arm having a lateral head arranged within said hollow head and a rear depending portion extending downwardly in and guided for vertical movements relatively to said first arm, an optical system including an eye piece mounted at the remote end of said hollow head and operatively connected to both of said heads and which system is therefore disposed at such a distance from the user as to necessitate bending over the instrument to make observations through said eye piece, coarse adjusting mechanism for shifting said first arm, fine adjusting mechanism for shifting said second arm relatively to the first arm to effect coarse and fine adjustments respectively of said optical system, and both of said mechanisms having operating knobs disposed near the lower end of said first arm and adjacent said base so as to be near the body of the user so that said mechanisms may be adjusted while the hands rest on the instrument supporting surface, and whereby said knobs can be readily located while the user is bending over and making observations through said eye piece 7. In a microscope, a base including a stage, an upright arm movably mounted on said base in rear of said stage and having a laterally extending hollow head overhanging said stage, an optical system connected to the free end of said hollow head, a second arm having an upright part slidably arranged for up and down movement relatively to said first arm in a guide in the upright part of said first arm and having a relatively large, laterally projecting head disposed in the hollow of said first head so as to also overhang said stage and which is also operatively connected to said optical system, and said head of said second arm having an upright transverse face at the free end thereof and remote from its guide connection with said first arm, and a transverse guide roller arranged in the hollow of said first arm against which said transverse face abuts, whereby binding of said second arm in its guide due to the weight of its head is prevented, adjusting means for effecting relative movements between said arms and adjusting means for effecting movement of both of said arms together.

8. A microscope having two relatively movable members, and means for adjusting one of said members with respect to the other including a shaft journalled in one of said members and arranged to operatively engage the other member, comprising oppositely extending split cones fitting in tapered seats in said member and having axial bores to receive said shaft, and compression means engaging said cones to force them into said seats and cause them to bind upon said shaft to an extent such that the movable members will be retained in their adjusted positions by the friction between said cones and said shaft.

9. In a microscope, two members having a vertical sliding connection therebetween, and means for adjusting one of said members with respect to the other including a shaft extending through a bore in one of said members and having a pinion engaging a rack on said other member, split bearing cones surrounding said shaft and fitting in tapered seats in said bore, caps surrounding said shaft and secured to the member in which it is journalled, and compression springs in said caps and bearing against said cones to cause them to grip said shaft to an extent such that when said rack and pinion are actuated, said members will be held in their adjusted positions by the friction between said cones and said shafts.

HARVEY N. OTT.